United States Patent [19]

Davis

[11] Patent Number: 5,704,624
[45] Date of Patent: Jan. 6, 1998

[54] SCUBA GEAR CART HAVING MULTI-TRANSPORT SURFACES

[76] Inventor: Gerald J. Davis, 231 Lanza Ave., Garfield, N.J. 07026

[21] Appl. No.: 544,964

[22] Filed: Oct. 27, 1995

[51] Int. Cl.[6] ........................ B62B 3/02
[52] U.S. Cl. .................. 280/47.34; 280/8; 280/19
[58] Field of Search ............ 280/47.331, 47.34, 280/79.11, 79.2, 79.3, 79.6, 79.7, 47.35, 47.36, 19, 19.1, 18, 18.1, 8

[56] References Cited

U.S. PATENT DOCUMENTS

| | | |
|---|---|---|
| Re. 32,844 | 1/1989 | Horowitz ............... 280/47.331 |
| 276,227 | 4/1883 | Crosby . |
| D. 296,026 | 5/1988 | Sugarman et al. . |
| 2,782,045 | 2/1957 | Hulbert . |
| 3,361,437 | 1/1968 | Loftis . |
| 3,580,403 | 5/1971 | Lancashire . |
| 3,669,464 | 6/1972 | Linzmeier . |
| 3,669,469 | 6/1972 | Hartelius . |
| 3,698,735 | 10/1972 | Bloomfield et al. . |
| 3,734,523 | 5/1973 | Field . |
| 3,734,526 | 5/1973 | Propet et al. . |
| 3,782,746 | 1/1974 | Isaacs . |
| 3,782,752 | 1/1974 | Gobetz . |
| 3,782,758 | 1/1974 | Williamson, III . |
| 3,920,258 | 11/1975 | Lundstrom et al. . |
| 3,920,259 | 11/1975 | Graham . |
| 3,920,260 | 11/1975 | Downing . |
| 3,920,263 | 11/1975 | Bundechuh . |
| 4,025,099 | 5/1977 | Virden . |
| 4,025,100 | 5/1977 | Bridgehase . |
| 4,285,529 | 8/1981 | Vailancourt ............... 280/19.1 |
| 4,362,458 | 12/1982 | Jantzi . |
| 4,362,459 | 12/1982 | Klausbrushner et al. . |
| 4,595,107 | 6/1986 | Welsch . |
| 4,732,399 | 3/1988 | Reilley et al. ............... 280/18.1 |
| 4,754,885 | 7/1988 | Rich . |
| 5,083,805 | 1/1992 | Monch et al. . |
| 5,104,135 | 4/1992 | Sheets . |
| 5,174,592 | 12/1992 | Pool . |
| 5,190,305 | 3/1993 | Putman . |
| 5,280,933 | 1/1994 | Finneyfrock . |
| 5,330,209 | 7/1994 | Pool . |
| 5,330,211 | 7/1994 | Nicholson . |
| 5,378,003 | 1/1995 | Burd et al. . |
| 5,397,139 | 3/1995 | Simpson . |

*Primary Examiner*—Richard M. Camby
*Attorney, Agent, or Firm*—Weingram & Associates, P.C.

[57] ABSTRACT

An improved cart is provided to transport objects, particularly scuba diving equipment, over different surfaces such as asphalt and sand. The cart includes a two portion housing, one portion of which is constructed as a hull-like member which is removably mountable to a second portion constructed as a platform adapted to retain the equipment. A surface of the platform is provided with a roller system. The cart can be inverted to bring either the hull or the roller system into contact with the underlying surface over which the cart is to be transported to facilitate movement of the cart along the particular composition of underlying surface.

20 Claims, 1 Drawing Sheet

5,704,624

SCUBA GEAR CART HAVING MULTI-TRANSPORT SURFACES

BACKGROUND OF THE INVENTION

1. Field of the Invention

The present invention relates to carts, creepers, dollies and the like employed to transport persons and materials over different types of surfaces, and in particular, to those carts, etc. constructed to be inverted to provide two different transport surfaces, each of which is adapted to a particular surface material over which the cart is moved.

2. Description of the Related Art

Carts, creepers and dollies are known to transport persons and materials over underlying surfaces and are described in the following patents.

| U.S. PAT. NO. | INVENTOR(S)/ASSIGNEE |
| --- | --- |
| 276,227 | Crosby |
| 296,026 | Sugarman et al. |
| 2,782,045 | Hulbert |
| 3,361,437 | Loftis |
| 3,580,403 | The Boeing Company |
| 3,669,464 | Linzmeier |
| 3,669,469 | Hartelius |
| 3,698,735 | Bloomfield et al. |
| 3,734,523 | Field |
| 3,734,526 | Propet et al. |
| 3,782,746 | Isaacs |
| 3,782,752 | Gobetz |
| 3,782,758 | Williamson III |
| 3,920,258 | Lundstrom et al. |
| 3,920,259 | Graham |
| 3,920,260 | Downing |
| 3,920,263 | Bundechuh |
| 4,025,099 | Virden |
| 4,925,100 | Bridgehouse |
| 4,362,458 | Jantzi |
| 4,362,459 | Klausbrushner et al. |
| 4,595,107 | Welsch |
| 4,754,885 | Rich |
| 5,083,805 | Monch et al. |
| 5,104,135 | Sheets |
| 5,174,592 | Pool |
| 5,190,305 | Putman |
| 5,280,933 | Finneyfrock |
| 5,330,209 | Pool |
| 5,330,211 | Nicholson |
| 5,378,003 | Burd et al. |
| 5,397,139 | Simpson |

Along many shore lines of the United States and other areas of the world, asphalt and uniform road surfaces intersect rugged land, terrain, mud, gravel, sand, and the like. In addition, snow can also cover the terrain providing for a difficult traverse of the terrain. It is not uncommon for recreationalists, and particularly scuba divers, to have to traverse these areas before they reach the shore or other body of water that is to be explored.

In addition, local regulations often restrict how close automobiles and other motor vehicles can get to a shore or other body of water, thereby necessitating portage of equipment from the parking area to the shore. The distances that scuba divers must travel with their gear can be substantial.

To add to the problem of traversing these areas, known carts may have a transport surface ideally suited for a particular type of material, e.g. asphalt. Unfortunately, the asphalt will probably not extend all the way to the shore line. The diver will therefore be exposed to different types of terrain which possibly consists of a material that shifts, e.g. sand, dirt, snow, etc.

It is therefore desirable to have a transport apparatus which is constructed with surface areas suitable to travel over different types of terrain that must be traversed prior to reaching the body of water where diving operations are to occur.

It is also desirable to have a transport apparatus which is constructed with surface areas suitable to travel over solid terrain, as well as bodies of water, swamps, bogs and the like.

OBJECTS AND SUMMARY OF THE INVENTION

It is an object of the present invention to provide a cart constructed to contain and transport scuba diving equipment from one location to another in an easy, convenient manner, regardless of the underlying surface over which the cart traverses.

It is an object of the present invention to provide a cart which provides a plurality of surfaces, each one of the surfaces conducive to the particular material over which the cart is formed.

It is an object of the present invention to provide a cart which has a surface area constructed with trough-like depressions adapted to releasably receive particular types of scuba diving equipment.

It is an object of the present invention to provide a cart which includes a light so that the cart and surrounding area can be illuminated during night diving operations.

It is an object of the present invention to provide a cart which is easily assembled and disassembled for storage and transport.

It is an object of the present invention to provide a cart with elements constructed and arranged to facilitate pulling the cart over an underlying surface regardless of the composition of the underlying surface.

The cart apparatus of the present invention includes a platform having opposed surfaces, one surface of which is provided with a roller assembly, while the opposite surface is adapted to receive a hull-like structure removably mountable to the platform. The surface of the platform over which the hull is removably mounted is also constructed with a depressed region to receive, in particular, scuba tanks, a weight belt or other scuba diving equipment.

BRIEF DESCRIPTION OF THE DRAWINGS

For a more complete understanding of the present invention, reference may be had to the following description of exemplary embodiments of the present invention considered in connection with the accompanying drawings, of which.

DETAILED DESCRIPTION OF THE PREFERRED EMBODIMENTS

Figure 1:
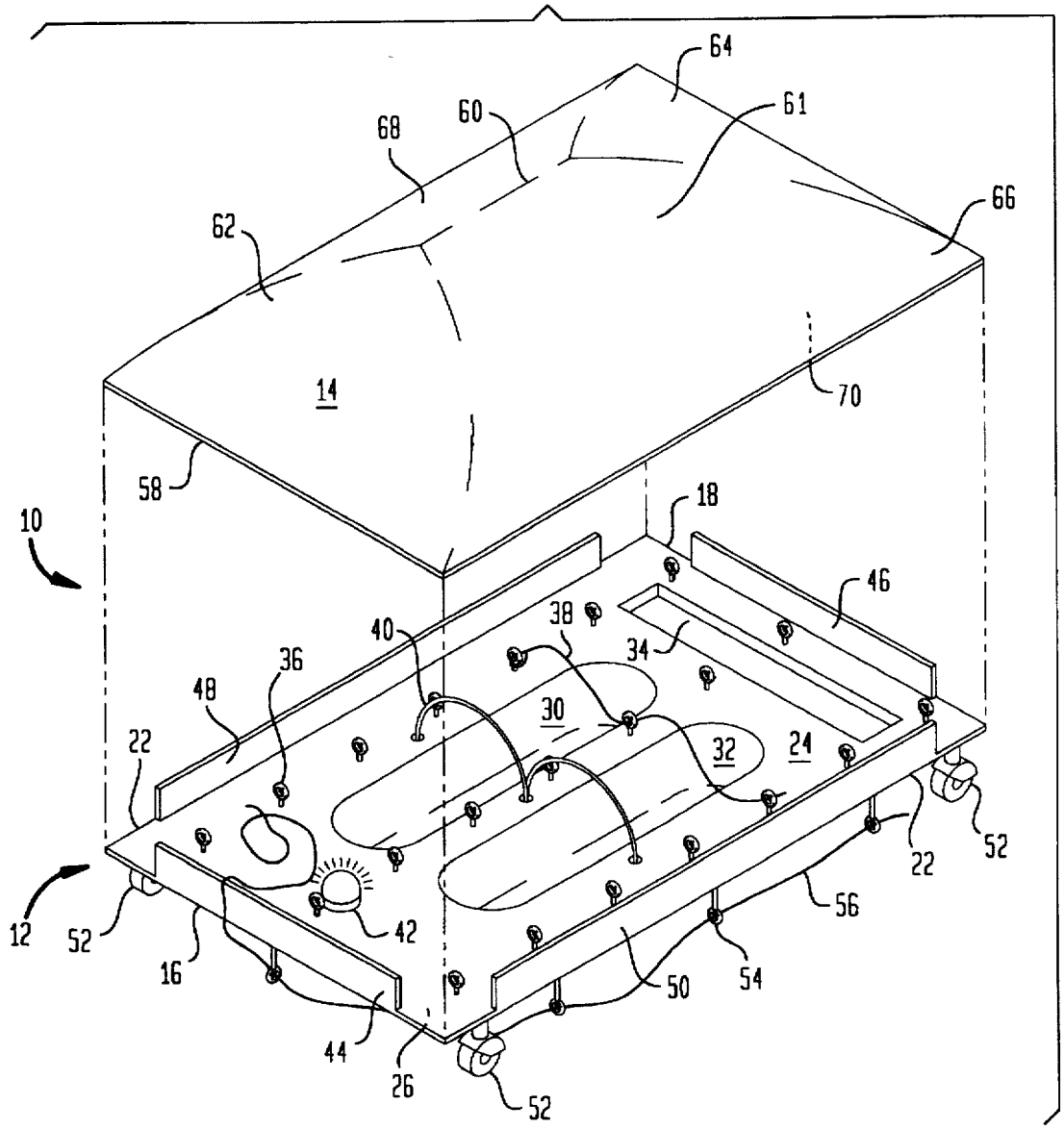
FIG. 1 is a perspective view of a scuba gear cart having multi-transport surfaces according to the present invention.

Referring to FIG. 1, a scuba cart having multi-transport surfaces 10 according to the present invention is shown. Although the present invention is referred to as a cart, it is understood that this designation is used to include other devices such as a wagon, creeper or the like, but will be referred to as a cart for purposes of the description which follows. By way of example, the cart is described for use to transport scuba diving equipment. However, the cart can be used to transport other types of equipment or recreational gear.

The cart 10 of the present invention includes two components removably mountable to each other. A first component is a platform 12, while the other component is a hull-like structure 14 which is removably mountable to the platform 12.

The platform 12 is constructed as a longitudinal member having a front end 16 and a rear end 18 opposed to each other, and side portions 20,22 also opposed to each other. The platform 12 is also formed with opposed surfaces 24,26 constructed for particular application as described hereinafter. The platform 12 is also formed with a perimeter 28 circumscribing a rectangular shape, although the platform 12 can be formed in other shapes as well.

The surface 24 of the platform 12, for purposes of discussion, can be referred to as the top surface. Although, when the cart 12 of the present invention is used as intended, the surface 24 will be inverted and appear to be a bottom surface of the platform 12. The surface 24 is formed with at least one and preferably a pair of cylindrically-shaped troughs 30,32 or depressions by machining or at a point of manufacture of the platform 12. The troughs 30,32 have sidewalls which are sized and shaped to receive, in particular, compressed air cylinders or tanks (not shown) which are employed during scuba diving operations.

Another trough 34 or depression is also formed in the surface 24 of the platform 12 near the rear end 18 of the platform 12. The trough 34 is preferably sized and shaped with rectangular dimensions to receive a diver's weight belt (not shown), although the size and shape of the sidewalls of the trough 34 can be formed to receive equipment having other shapes as well.

Extending over the surface 24 of the platform 12 is a securing means 36 consisting of a plurality of eye hooks. The eye hooks 36 are arranged along the surface 24 so that flexible members 38 such as lashing, bungee cords or other similar retaining devices can be threaded through the eye hooks 36 to secure the equipment to the surface 24 and that equipment disposed in the troughs 30,32,34.

A pair of U-braces 40 are also provided and releasably engagable to the surface 24 while straddling the troughs 30,32. The U-braces 40 are adjustable at the surface 24 to accommodate the different diameters of the compressed air cylinders.

A light 42 is removably mounted to the surface 24 to illuminate the platform 12 as well as the area surrounding the cart 10. Preferably, the light 42 will be provided with a colored lens, such as red, which reduces night blindness during nighttime diving operations.

The platform 12 is provided at the surface 24 with a peripheral enclosure means which includes a plurality of removably mountable side bars or panels 44,46,80,50 (referred to collectively as "44-50") extending upward from the surface 24. The side bars 44-50 assist in retaining the equipment at the surface 24 of the platform 12. In addition, the side bars 44-50 shore-up and assist in securing and stabilizing the hull-like structure 14 when it is removably mounted to the platform 12, as will be described hereinafter.

The surface 26 of the platform 12 is provided with a roller assembly consisting of a plurality of roller members 52 (three of which are shown due to the perspective of FIG. 1). The roller members can be plastic wheels, casters or other roller devices of known construction.

The surface 26 is also provided with a plurality of eye hooks 54 through which a flexible member 56 is threaded. The eye hooks 54 extend from the surface 26 and terminate at a distance from the surface 26 less than the distance that the roller members 52 extend from the surface 26.

The hull-like structure 14 preferably is formed as a continuous sidewall 61 extending to a peripheral edge 58 sized and shaped to conform to the perimeter or peripheral edge 28 of the platform 12, when the hull or peripheral edge 58 is removably mounted to the platform 12. The hull 14 includes a keel 60, a forward portion 62, and aft portion 64 opposite to the forward portion 62, and opposed walls 66,68. The keel 60 of the platform 12 interconnects the forward and aft portions 62,64 and the walls 66,68. The hull 14 has an open end 70 sized and shaped to receive the surface 24 of the platform 12 and any equipment disposed thereon when the hull 14 is removably mounted to the platform.

The surface 26 can also be used to retain equipment by using additional flexible members 38 secured to the eye hooks 54, when the hull portion 14 is used as the transport surface.

Both the platform 12 and the hull 14 are preferably constructed from materials which are impermeable to water and particularly salt water environments. To this end, the platform 12 and the hull 14 can be constructed from polymers such as plastics or light alloys such as aluminum. If wood or pressed board is used, it is preferable that these materials are treated to resist corrosion from water, salt or other chemicals. The hull can also be marked with indicia such as that associated with divers or diving operations, or any other indicia selected by the user.

Although the cart 10 of the present invention is adapted for use by scuba divers, other applications of the cart may be employed because of its versatile, inexpensive construction. The following description of the operation of the cart 10 of the present invention is presented using scuba diving operations as the example.

In operation, a scuba diver would load the surface 24 of the platform 12 with the scuba diving equipment. The equipment usually consists of at least one and sometimes two compressed air tanks, a regulator, dive belt, wet suit, mask, snorkel, various gauges for time, pressure, depth and direction, buoyancy compensation vest, sample bags, swim fins, a spear gun, knife, emergency and signalling equipment, fresh water, a change of clothes and any other equipment necessary for diving operations. At this stage, as discussed earlier, the troughs 30,32 receive the compressed air tanks, while the trough 34 can receive the weight belt. The U-shaped braces 40 are adjusted to secure the compressed air tanks in place, while the lashing 38 is also adjustably tightened to secure other equipment at the surface 24 of the platform. The side bars 44-50 are removably mounted to the platform as an added precaution, and the light is secured to reserve power. If the cart 10 has not been loaded into a car, it can be pulled by the lashing 56 or rolled to the car or van into which it is hoisted for transport to the dive area.

The hull 14 can be removably mounted to the platform 12 so that the surface 24 of the platform 12 and equipment is received in an opening 70 defined by the portions 62,64 and walls 66,68 of the hull-shaped or hull-like structure 14. Alternatively, the hull 14 can be kept separate from the platform 12 until the destination is reached. The hull 14 is retained at the platform 12 by pressure or friction fit, or can be secured by a wing-nut or bolt-nut combination (not shown).

Upon arrival at the dive site, the platform is removed from the vehicle to traverse the cement, asphalt, brick, wood surface etc. on the rollers 52.

In the event that the diving operations will occur at the shore, the platform can be dragged along the stable underlying surface of the parking lot for example, up to the sand or perhaps snow if diving operations are to occur during the colder months. Until now, the lashing 56 has been used to pull the cart 10 over the more dense and stable underlying surfaces. As discussed above, the eye hooks 54 do not extend as far from the surface 26 as the rollers 52, so the eye hooks do not contact the underlying surface.

Upon arrival at the shifting surface of sand, dirt or snow, the cart is inverted to bring the hull 14 into contact with the shifting surface. The U-braces 40 and the lashing 38 retain the equipment at its mounted positions. The cart 10 can now be pulled by the lashing 56 along the underlying shifting surface. The hull 14 is a more suitable structure to traverse the sand or snow and requires less effort on the part of the individual pulling the cart 10. The hull 14 also provides for a smoother, more stable ride for the scuba equipment.

Upon arrival at the dive site, the cart 10 is again inverted and the hull 14 removed from the platform 12 to access the dive equipment for the dive operation.

Upon conclusion of the dive operation, the equipment is again stored at the appropriate areas of the surface 24 of the platform 12 and the hull 14 removably mounted to the platform 12. The cart 10 is again inverted to bring the hull 14 to plane along the shifting surface and drag the cart 10 by the lashing 56 back to the automobile.

Upon arrival at the parking lot or more dense underlying surface, the cart 10 is again inverted to bring the rollers 52 in to contact with the underlying surface and the cart 10 is pulled by the lashing 56 to the automobile to be transported away.

The user of the cart 10 of the present invention may also have to traverse a small body of water to arrive at the body of water where the dive operation is to occur. In this regard, the hull 14 is employed as the transport surface to float and transport the scuba equipment across the intervening body of water. It is therefore desirable to have a water tight seal between the hull 14 and the platform 12. However, the buoyancy of the hull by virtue of the volume of air trapped in the open end 70 of the hull 14 should be sufficient to support the hull-platform interface above the water line.

In addition, if diving operations are suspended for a period of time, the hull 14 can be removably mounted to the platform 12 to keep sand and other debris away from the dive equipment prior to its use for a subsequent diving operation.

It is therefore desirable to construct the hull 14 of a substantially transparent material so that the contents of the cart 10 can be observed regardless of whether the platform 12 or the hull 14 is being employed as the transport surface.

By way of example, a construction of the cart 10 of the present invention would include overall dimensions of the platform to be at least 36 inches in length by 16 inches in width and approximately one-half inch in thickness. The sidebars 44–50 could each span the length of the corresponding portion of the peripheral edge 28 of the platform 12 or be slightly shorter in length. Preferably, the sidebars 44–50 are one to two inches in height off the surface 24 of the platform 12. Other dimensions of the elements of the cart 10 can be used as desired.

The roller members 52 are preferably four in number, each one removably mounted at a corresponding corner of the surface 26 of the platform 12. Preferably, each one of the roller members 52 is load tested to a minimum strength of 100 lbs.

The flexible member 56 as a pull cord should have a length sufficient to permit the cord to extend at least two feet and as much as four feet from the front end 16 of the platform 12.

The flexible member 56 can be made from a nylon cord.

It will be understood that the embodiments described herein are merely exemplary and that a person skilled in the art may make many variations and modifications without departing from the sphere and scope of the invention. All such variations and modifications are intended to be included in the scope of the invention as defined in the appended claims.

What is claimed is:

1. An apparatus for transporting scuba equipment, comprising:
   a first portion comprising:
      a first surface for retaining the scuba equipment, the first surface having at least one cylindrically-shaped depression sized and shaped to receive a compressed air tank, and
      at least one substantially rectangularly-shaped depression to receive a weight belt;
   a second surface opposite to the first surface, the second surface comprising:
      conveying means constructed and arranged along the second surface to support the first portion for conveyance over an underlying surface; and
   a second portion removably mountable to the first portion, comprising:
      a continuous sidewall comprising:
         an interior surface extending to a peripheral edge of the continuous sidewall,
         an exterior surface extending from the peripheral edge, the exterior surface sized and shaped to support the second portion for movement over the underlying surface;
   wherein the first portion and the second portion are adapted to be inverted between a first position where the conveying means of the first portion contacts the underlying surface, and a second position where the exterior surface of the continuous sidewall contacts the underlying surface.

2. The apparatus according to, claim 1, further comprising:
   retaining means adjustably mounted to the first surface of the first portion, the retaining means spanning a corresponding one of the depressions.

3. The apparatus according to claim 2, wherein the retaining means is a U-shaped member substantially conforming to a shape of the compressed air tank.

4. The apparatus according to claim 1, further comprising:
   securing means adjustably mounted at the first surface of the first portion, and
   at least one flexible cord sized and shaped to coact with the securing means to secure the equipment to the first surface of the first portion.

5. The apparatus according to claim 4, wherein the securing means comprises:
   a plurality of eye hooks.

6. The apparatus according to claim 1, further comprising:
   light means disposed at the first surface of the first portion to illuminate the first portion and an area surrounding the apparatus.

7. The apparatus according to claim 1, wherein the conveying means comprises:
   a plurality of wheels.

8. The apparatus according to claim 1, further comprising:
   securing means adjustably mounted to the second surface of the first portion, and
   a flexible member coacting with the securing means, the flexible member adapted to be gripped to pull the first portion over the underlying surface.

9. The apparatus according to claim 8, wherein the securing means comprises:

a plurality of eye hooks.

10. The apparatus according to claim 1, wherein the first portion further comprises:

enclosure means disposed at the first surface of the first portion to retain the scuba equipment at the first surface.

11. The apparatus according to claim 10, wherein the enclosure means comprises:

a plurality of panels, each one of the plurality of panels removably mounted to a corresponding area of the first surface of the first portion.

12. The apparatus according to claim 1, wherein the second portion is formed from a substantially transparent material.

13. The apparatus according to claim 1, wherein the first portion comprises:

a platform.

14. The apparatus according to claim 1, wherein the second portion comprises:

a hull-shaped member.

15. A transport apparatus, comprising:

a first portion comprising:
a first conveying surface,
a retaining surface opposite to the first conveying surface and upon which objects to be transported are retained;

a second portion removably mountable to the first portion, the second portion comprising:
a second conveying surface,
an interior surface opposite to the second conveying surface;

retaining means removably mounted proximate to a peripheral edge of the retaining surface of the first portion;

wherein the transport apparatus can be inverted between a first position where the first conveying surface of the first portion contacts an underlying surface over which the transport apparatus is conveyed, and a second position where the second conveying surface of the second portion contacts the underlying surface over which the transport apparatus is conveyed.

16. The transport apparatus according to claim 15, wherein the first conveying surface comprises wheels, and the second conveying surface comprises a hull-shaped member.

17. The transport apparatus according to claim 15, wherein the retaining means comprises:

a plurality of panels.

18. The transport apparatus according to claim 15, further comprising:

at least one depressed region formed in the retaining surface and in which the objects can be disposed.

19. The transport apparatus according to claim 15, further comprising:

securing means adjustably mounted to the retaining surface of the first portion, the securing means adapted to adjustably retain the objects at the retaining surface.

20. The transport apparatus according to claim 15, further comprising:

light means mounted to the first portion to illuminate the first portion and an area surrounding the apparatus.

* * * * *